United States Patent
Gaillard et al.

(10) Patent No.: US 9,219,940 B2
(45) Date of Patent: Dec. 22, 2015

(54) FAST CHANNEL CHANGE FOR HYBRID DEVICE

(75) Inventors: Etienne Gaillard, La Celle Saint-Cloud (FR); Damien Alliez, Noizav (FR); Nicolas Gaude, Issy les Moulineaux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/113,359

(22) PCT Filed: Apr. 18, 2012

(86) PCT No.: PCT/IB2012/051940
§ 371 (c)(1),
(2), (4) Date: Dec. 26, 2013

(87) PCT Pub. No.: WO2012/150519
PCT Pub. Date: Nov. 8, 2012

(65) Prior Publication Data
US 2014/0137176 A1    May 15, 2014

(30) Foreign Application Priority Data
May 4, 2011    (GB) .................................. 1107386.3

(51) Int. Cl.
*H04N 7/173*    (2011.01)
*H04N 21/434*    (2011.01)
(Continued)

(52) U.S. Cl.
CPC ......... *H04N 21/4347* (2013.01); *H04N 21/236* (2013.01); *H04N 21/23106* (2013.01);
(Continued)

(58) Field of Classification Search
None
See application file for complete search history.

(56) References Cited

U.S. PATENT DOCUMENTS 5,598,415 A * 1/1997 Nuber et al. ................... 370/474
6,615,382 B1 * 9/2003 Kang et al. .................... 714/748
(Continued)

FOREIGN PATENT DOCUMENTS

EP    1 487 215 A2    12/2004
EP    1 675 399 A2    6/2006
(Continued)

OTHER PUBLICATIONS

Jan. 28, 2013 Transmittal of International Search Report and Written Opinion of the International Searching Authority for PCT/IB2012/051940.
(Continued)

*Primary Examiner* — Nathan Flynn
*Assistant Examiner* — William J Kim
(74) *Attorney, Agent, or Firm* — Hahn Loeser & Parks LLP

(57) ABSTRACT

There is provided according to embodiments of the invention a method of changing channels in a hybrid multicast video distribution environment, which is carried out by receiving a plurality of multicast video streams concurrently in a server, buffering first segments of the video streams respectively, wherein the first segments comprise an independently decodable frame and zero or more predicted frames, encoding the first segments to form new segments having new frame quality parameters that are less than the frame quality parameters of the first segments, assembling the first segments and the new segments into respective channel packs of the video streams, and responsively to a request, identifying one of the video streams and transmitting at least a portion of the oldest stored channel pack of the one video stream from the server to a receiving device. Related apparatus and methods are also described.

10 Claims, 4 Drawing Sheets

(51) Int. Cl.
  *H04N 21/231* (2011.01)
  *H04N 21/2343* (2011.01)
  *H04N 21/236* (2011.01)
  *H04N 21/258* (2011.01)
  *H04N 21/438* (2011.01)
  *H04N 21/6405* (2011.01)
  *H04N 21/845* (2011.01)
  *H04N 21/44* (2011.01)
  *H04N 21/61* (2011.01)

(52) U.S. Cl.
  CPC . *H04N21/23439* (2013.01); *H04N 21/234363* (2013.01); *H04N 21/234381* (2013.01); *H04N 21/25808* (2013.01); *H04N 21/4384* (2013.01); *H04N 21/44004* (2013.01); *H04N 21/6193* (2013.01); *H04N 21/6405* (2013.01); *H04N 21/8456* (2013.01)

(56) References Cited

U.S. PATENT DOCUMENTS

| | | | |
|---|---|---|---|
| 6,728,965 | B1 | 4/2004 | Mao |
| 7,430,222 | B2 | 9/2008 | Green et al. |
| 7,444,419 | B2 | 10/2008 | Green |
| 7,477,653 | B2 | 1/2009 | Smith et al. |
| 7,562,375 | B2 | 7/2009 | Barrett et al. |
| 8,516,531 | B2* | 8/2013 | Hearn et al. .................... 725/94 |
| 2002/0002708 | A1* | 1/2002 | Arye ................................ 725/95 |
| 2005/0081243 | A1* | 4/2005 | Barrett et al. ................... 725/86 |
| 2006/0200574 | A1 | 9/2006 | Pickens et al. |
| 2007/0160038 | A1 | 7/2007 | Liu et al. |
| 2007/0248165 | A1* | 10/2007 | Boyce et al. ............. 375/240.02 |
| 2008/0144626 | A1* | 6/2008 | Bertinelli et al. ............. 370/392 |
| 2009/0070844 | A1* | 3/2009 | Beer et al. ...................... 725/119 |
| 2010/0115566 | A1 | 5/2010 | Haimi-Cohen |
| 2010/0138886 | A1* | 6/2010 | Henry et al. ................... 725/110 |
| 2011/0072484 | A1 | 3/2011 | Horen |
| 2012/0002731 | A1* | 1/2012 | Pelts et al. ............... 375/240.25 |
| 2012/0163476 | A1* | 6/2012 | Gautier et al. ........... 375/240.26 |
| 2012/0304236 | A1* | 11/2012 | Qiu et al. ....................... 725/109 |

FOREIGN PATENT DOCUMENTS

| | | |
|---|---|---|
| WO | WO 2006/031925 A2 | 3/2006 |
| WO | WO 2006/084503 A1 | 8/2006 |
| WO | WO 2008/103996 A1 | 8/2008 |
| WO | WO 2008/151987 A1 | 12/2008 |

OTHER PUBLICATIONS

Aug. 2, 2011 Office Communication in connection with prosecution of GB 1107386.3.

May 31, 2013 Office Communication in connection with prosecution of GB 1107386.3.

"Advanced Video Coding for Generic Audiovisual Services," Series H: Audiovisual and Multimedia Systems—Infrastructure of Audio-visual Services—Coding of Moving Video, ITU-T Recommendation H.264 (Mar. 2005).

"Information Technology—Generic Coding of Moving Pictures and Associated Audio Information: Systems," International Standard ISO/IEC 13818-1 (2d edition, Dec. 1, 2000).

Oxford English Dictionary; (on-line Jul. 13, 2015), entry for "Iteration".

Harry Newton, Newton's Telecom Dictionary; (28th ed.), p. 687 (2014).

\* cited by examiner

FAST CHANNEL CHANGE FOR HYBRID DEVICE

RELATED APPLICATION INFORMATION

The present application claims the benefit of priority from GB Patent Application GB 1107386.3 of NDS Limited, filed 4 May 2011.

FIELD OF THE INVENTION

The present invention relates in general to communication systems, and particularly, but not exclusively, to communication systems based on satellite transmission.

BACKGROUND TO THE INVENTION

The meanings of certain acronyms and abbreviations used herein are given in Table 1.

TABLE 1

| Acronyms and Abbreviations | |
|---|---|
| AAA | Authentication, Authorization, and Accounting |
| FCCHD | Fast Channel Change High Definition |
| GOP | Group of Pictures |
| HD | High Definition |
| IP | Internet Protocol |
| MPEG-2 | Motion Picture Experts Group 2 |
| MPEG2-TS | Motion Picture Experts Group 2 Transport Stream |
| onid | Original Network Identifier |
| PCR | Program Clock Reference |
| SD | Standard Definition |
| sid | Station Identifier |
| STB | Set-Top Box |
| SVG | Scalable Vector Graphics |
| tsid | Transport Stream Identifier |

As digital television transmission has replaced analog broadcasts, viewers have found that the advantages of the newer mode are offset by a relatively long latency period when changing channels, as compared to the nearly instant response of a traditional analog tuner. This is a consequence of motion-compensated video encoding schemes, of which the well-known MPEG-2 standard is exemplary. The following international standards and specifications are particularly relevant to the understanding of the disclosure of the present invention: ITU-T Specification H.264 (March 2005), Advanced Video Coding for Generic Audiovisual Services; ISO/IEC 13818-1, Information Technology—Generic Coding of Moving Pictures and Associated Audio Information: Systems (Second Edition, 2000).

A video sequence known as a "group of pictures" (GOP) begins with an I-Frame, which is an independently decodable frame. The I-frame is followed by zero or more "predicted frames" known as P-frames and B-frames, which are encoded relative to the I-frame and/or one another, and generally cannot be decoded unless the I-frame is known. In other words, the GOP is decodable only once the I-frame has become available to the decoder.

A channel change request may occur randomly in the course of an MPEG-2 stream. It therefore is generally unaligned with the current I-frame. Hence, decoding of a new MPEG-2 stream is delayed until arrival of a new I-frame. This delay can be many seconds in duration, particularly when there is little motion occurring in the image being transmitted. The delay in video presentation may be increased even more by inherent latencies within the decoder. The result, if not compensated in some manner, is user dissatisfaction.

U.S. Pat. No. 7,562,375 proposes to change channels in a digital video environment by configuring a server to retain at least one independent frame for each video channel of multiple video channels that are being distributed using multicast communications. The server is adapted to respond to channel change requests from clients by transmitting the retained independent frame of a requested video channel to a requesting client using unicast communication.

U.S. Pat. No. 7,430,222 discloses facilitating a fast channel change by receiving and decoding a unicast acquisition media stream that corresponds to a soon-to-be requested target multicast media stream. This occurs before requesting the target multicast media stream of the new channel. Once the transmission of the unicast stream is caught up with the multicast stream, the unicast acquisition stream is spliced to the target multicast media stream.

SUMMARY OF THE INVENTION

The present invention, in certain embodiments thereof, seeks to provide an improved communication system for receiving multicast video streams in a hybrid environment.

There is provided according to embodiments of the invention a method of changing channels in a hybrid multicast video distribution environment, which is carried out by receiving a plurality of multicast video streams concurrently in a server, buffering first segments of the video streams respectively, wherein the first segments comprise an independently decodable frame and zero or more predicted frames, encoding the first segments to form new segments having new frame quality parameters that are less than the frame quality parameters of the first segments, assembling the first segments and the new segments into respective channel packs of the video streams, and responsively to a request, identifying one of the video streams and transmitting at least a portion of an oldest stored channel pack of the one video stream from the server to a receiving device.

According to an aspect of the method, the video streams may have a plurality of bit rates and a plurality of video compression formats.

Still another aspect of the method includes down-sampling the first segments, such that at least a portion of the new segments have a smaller bit-rate than the first segments, respectively.

An additional aspect of the method includes reducing a framing rate of the first segments.

One aspect of the method includes maintaining a profile of an issuer of the request, the profile including an available bandwidth of a communication channel between the server and the issuer of the request. The profile may include a description of a delivery path to the issuer of the request through a data network.

A further aspect of the method includes selecting the portion of the oldest stored channel pack responsively to an analysis of the profile.

According to yet another aspect of the method, the channel packs have different numbers of the new segments.

There is further provided according to embodiments of the invention an apparatus for changing channels in a hybrid multicast video distribution environment, including a server that is operative for receiving a plurality of multicast video streams concurrently, a channel pack module for buffering first segments of the video streams respectively, wherein the first segments comprise an independently decodable frame and zero or more predicted frames. The channel pack module is operative for encoding the first segments to form new segments having new frame quality parameters that are less than the frame quality parameters of the first segments, and for assembling the first segments and the new segments into respective channel packs of the video streams. The apparatus includes a cache storing recently assembled channel packs of the video streams and a network interface, through which the server is operative for transmitting, responsively to a request identifying one of the video streams, at least a portion of the oldest stored channel pack of the one video stream from the server to a receiving device.

According to an aspect of the apparatus, the video streams may have a plurality of bit rates and a plurality of video compression formats.

According to an additional aspect of the apparatus, encoding the first segments includes down-sampling, such that at least a portion of the new segments have a smaller bit-rate than the first segments, respectively.

According to still another aspect of the apparatus, encoding the first segments includes reducing a framing rate thereof.

In yet another aspect, the apparatus includes a data storage unit for maintaining a profile of an issuer of the request, the profile including an available bandwidth of a communication channel between the server and the issuer of the request. The profile may also include a description of a delivery path to the issuer of the request through a data network.

According to aspect of the apparatus, the server is operative for selecting the portion of the oldest stored channel pack responsively to an analysis of the profile.

According to one aspect of the apparatus, the channel packs have different numbers of the new segments.

There is further provided according to embodiments of the invention a method of changing channels in a hybrid multicast video distribution environment, which is carried out by receiving, decoding and rendering a first multicast video stream on a display using a receiving device having a synchronization module, and receiving an order for a channel change operation from the first multicast video stream to a second multicast video stream. The method is further carried out, responsively to the order and while receiving the second multicast video stream, by requesting a channel pack from a fast channel change server, the channel pack including an encoded segment of the second multicast video stream that has an independently decodable frame and zero or more predicted frames of the second multicast video stream. Frame quality parameters of the encoded segment are less than frame quality parameters of a corresponding segment of the second multicast video stream. The method is further carried out by accepting the requested channel pack from the fast channel change server, decoding and rendering the encoded segment of the accepted channel pack on the display, and determining in the synchronization module a time shift between a frame of the accepted channel pack and a corresponding frame of the second multicast video stream. The method is further carried out by iteratively requesting a new channel pack from the fast channel change server, and with the new channel pack again accepting the requested channel pack, decoding and rendering the encoded segment and determining a time shift at intervals that are less than a playback duration of corresponding segments of the second multicast video stream until the time shift is less than a predetermined value, and thereafter rendering the second multicast video stream on the display.

According to an aspect of the method, the encoded segment is a down-sampled version of the corresponding segment of the second multicast video stream, such that the encoded segment has a smaller bit-rate than the corresponding segment of the second multicast video stream.

According to a further aspect of the method, the encoded segment has a smaller framing rate than the corresponding segment of the second multicast video stream.

According to still another aspect of the method, the first multicast video stream has a different video compression format than the second multicast video stream.

According to an additional aspect of the method, the first multicast video stream is received at a different bit rate than the second multicast video stream.

There is further provided according to embodiments of the invention an apparatus for changing channels in a hybrid multicast video distribution environment, including a receiver operative for decoding and rendering a first multicast video stream on a display and having a user interface and a communications interface linked to a fast channel change server, a synchronization module cooperative with the receiver. The receiver and the synchronization module are co-operative for receiving an order via the user interface for a channel change operation from the first multicast video stream to a second multicast video stream; responsively to the order and while receiving the second multicast video stream requesting a channel pack via the communications interface from the fast channel change server, the channel pack including an encoded segment of the second multicast video stream having an independently decodable frame and zero or more predicted frames of the second multicast video stream. Frame quality parameters of the encoded segment are less than frame quality parameters of a corresponding segment of the second multicast video stream. The receiver and the synchronization module are further co-operative for accepting the requested channel pack from the fast channel change server, decoding and rendering the encoded segment of the accepted channel pack on the display. The synchronization module is operative for determining a time shift between a frame of the accepted channel pack and a corresponding frame of the second multicast video stream. The receiver and the synchronization module are further co-operative for iteratively requesting a new channel pack from the fast channel change server, and again accepting the new channel pack, decoding and rendering the encoded segment and determining a time shift at intervals that are less than a playback duration of corresponding segments of the second multicast video stream until the time shift is less than a predetermined value, and thereafter decoding and rendering the second multicast video stream on the display.

According to aspect of the apparatus, the encoded segment is a down-sampled version of the corresponding segment of the second multicast video stream, such that the encoded segment has a smaller bit-rate than the corresponding segment of the second multicast video stream.

According to one aspect of the apparatus, the encoded segment has a smaller framing rate than the corresponding segment of the second multicast video stream.

According to an additional aspect of the apparatus, the first multicast video stream has a different video compression format than the second multicast video stream.

According to still another aspect of the apparatus, the first multicast video stream is received at a different bit rate than the second multicast video stream.

BRIEF DESCRIPTION OF THE DRAWINGS

For a better understanding of the present invention, reference is made to the de-tailed description of embodiments, by way of example, which is to be read in conjunction with the following drawings, wherein like elements are given like reference numerals, and wherein.

DETAILED DESCRIPTION OF EMBODIMENTS

Figure 1:
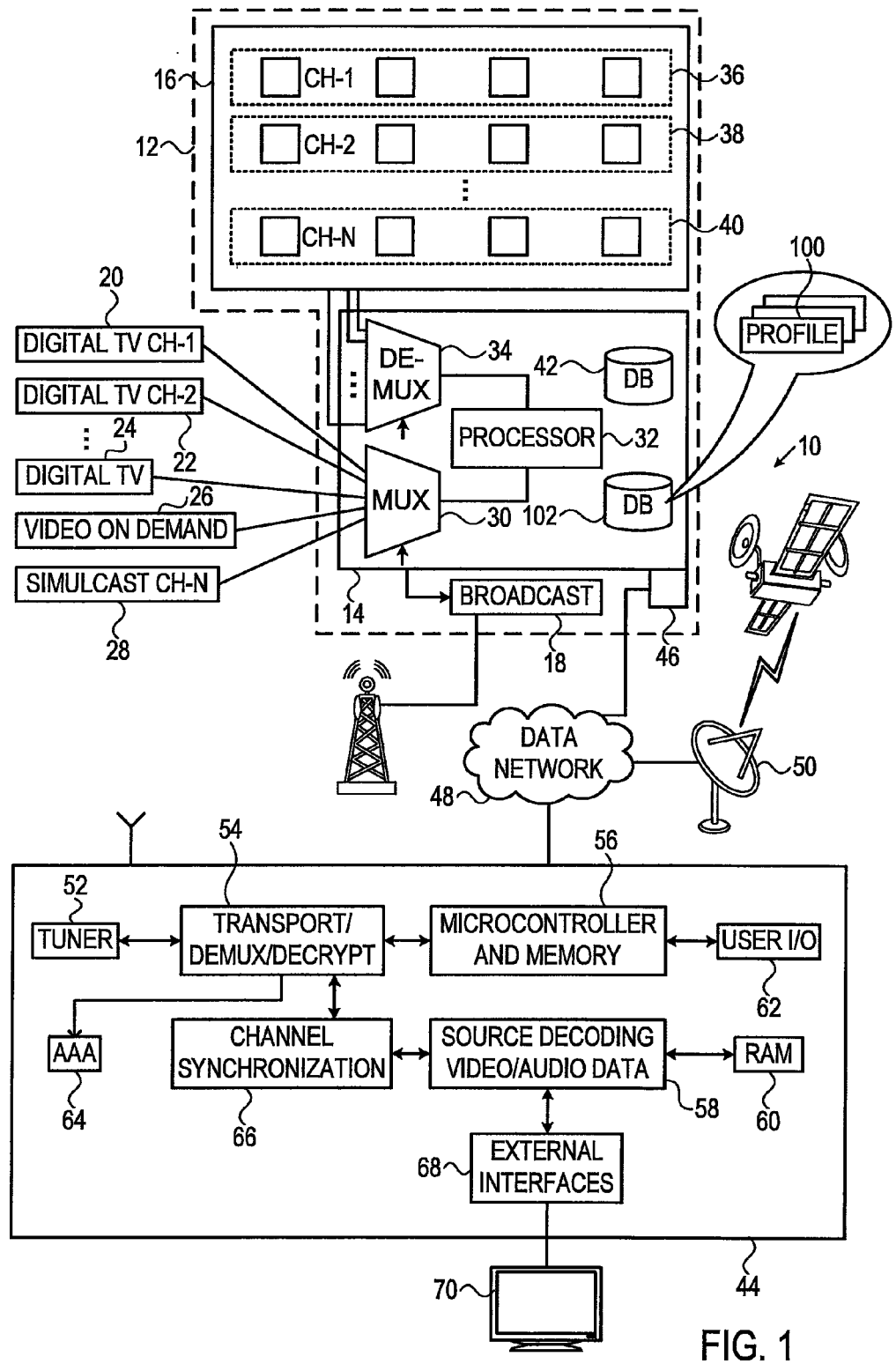
FIG. 1 is a schematic diagram of a system, which is constructed and operative in accordance with an embodiment of the invention.

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Embodiments of the present invention may include software programming code, which is typically maintained in permanent storage, such as a computer readable medium. In a client/server environment, such software programming code may be stored on a client or a server. The software programming code may be embodied on any of a variety of known non-transitory tangible media for use with a data processing system, such as a diskette, hard drive, or CD-ROM. The code may be distributed on such media, or may be distributed to consumers from the memory or storage of one computer system over a network of some type to storage devices on other computer systems for use by consumers of such other systems.

DEFINITIONS AND TERMINOLOGY

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream, which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example: encoded, but neither scrambled nor encrypted; compressed, but neither scrambled nor encrypted; scrambled or encrypted, but not encoded; scrambled or encrypted, but not compressed; encoded, and scrambled or encrypted; or compressed, and scrambled or encrypted.

Likewise, the terms "decoded" and "decompressed" one the one hand, and the terms "descrambled" and "decrypted" on the other hand, are used to refer to different and exclusive types of processing.

The terms "decimated" and "decimated slices" generally indicates a reduction in the frame quality of the stream by eliminating data in the frame, e.g., by reducing sampling rates, bit rates, or quantizing frame data, but not necessarily by a factor of 10.

System Architecture

Turning now to the drawings, reference is initially made to FIG. 1, which is a schematic diagram of a system 10, which is constructed and operative in accordance with an embodiment of the invention. The system 10 includes a hybrid head-end component 12, which includes a fast channel change server 14 coupled to a channel pack module 16 and a conventional broadcast head-end unit 18. The head-end component 12 is adapted to a hybrid environment in which the fast channel change server 14 processes multiple video streams concurrently. While shown as separate entities in FIG. 1, the fast channel change server 14 may be integral with the fast channel change server 14. It may be realized as a hardware device, implemented as executable program code, or as a combination of hardware and software.

An exemplary mix of digital services received by the fast channel change server 14 comprises any number of video and audio channels CH-1 . . . CH-N, shown as digital television streams 20, 22, 24, a video-on-demand stream 26, and a digital simulcast stream 28. These and other types of digital video streams may be received in many combinations and constitute a hybrid multicast video distribution environment for the system 10. The video streams may arrive at different bit rates, in different video compression formats. They may be encrypted differently or may be unencrypted. The arriving streams are multiplexed in multiplexor 30 Under control of a processor 32, the streams 20, 22, 24, 26, 28 are demultiplexed in demultiplexor 34 and segments of the streams assembled in the channel pack module 16 into respective units referred to herein as "channel packs" or sometimes as "packs", of which channel packs 36, 38, 40 are shown. The structure of the channel packs is described below. Assembled channel packs are returned from the channel pack module 16 for storage in channel database 42, which may be integral with the fast channel change server 14 as shown or embodied as a separate unit or included in the channel pack module 16. The channel database 42 caches a number of the most recently assembled channel packs. The number may be fixed, or adaptive to the characteristics of individual video streams and the capabilities of communication channels between the fast channel change server 14 and a receiving device 44.

The fast channel change server 14 operates as a unicast server that delivers on a per request basis recently assembled channel packs for a given channel to the receiving device 44, which is typically a set-top box. Delivery of the channel packs may be achieved by any convenient method. For example the fast channel change server 14 may be provided with a network interface 46 to a data network 48. Alternatively terrestrial radio or cable transmission or via a satellite receiving station 50 may be used.

The receiving device 44 may be a set-top box and typically includes a tuner 52, a transport demultiplexing and decryption module 54, which operates under control of a microcontroller 56, which has associated memory, a source decoder 58 and communicatively coupled random access memory 60. A user I/O device 62 provides a user interface for accepting subscriber commands such as channel change requests, and for providing output information. The receiving device 44 optionally is provided with a module 64 for performing authentication, authorization, and accounting (AAA) functions. A synchronization component 66 deals with certain events that occur during a channel change sequence. External interfaces 68 deliver suitably decoded and descrambled video to a display 70.

The receiving device 44 processes conventional broadcast signals from the broadcast head-end unit 18 at all times. However, during a channel change operation from an old to a new channel, the receiving device 44 additionally requests and receives channel packs from the fast channel change server 14. In order to execute the requested channel change operation according to embodiments of the invention, selected slices of the channel packs are decoded and rendered, while concurrently monitoring PCRs from the conventional broadcast stream of the new channel. At the conclusion of the channel change operation, the receiving device 44 ceases requesting channel packs and resumes processing the conventional broadcast stream of the new channel.

Channel Packing Component

Figure 2:
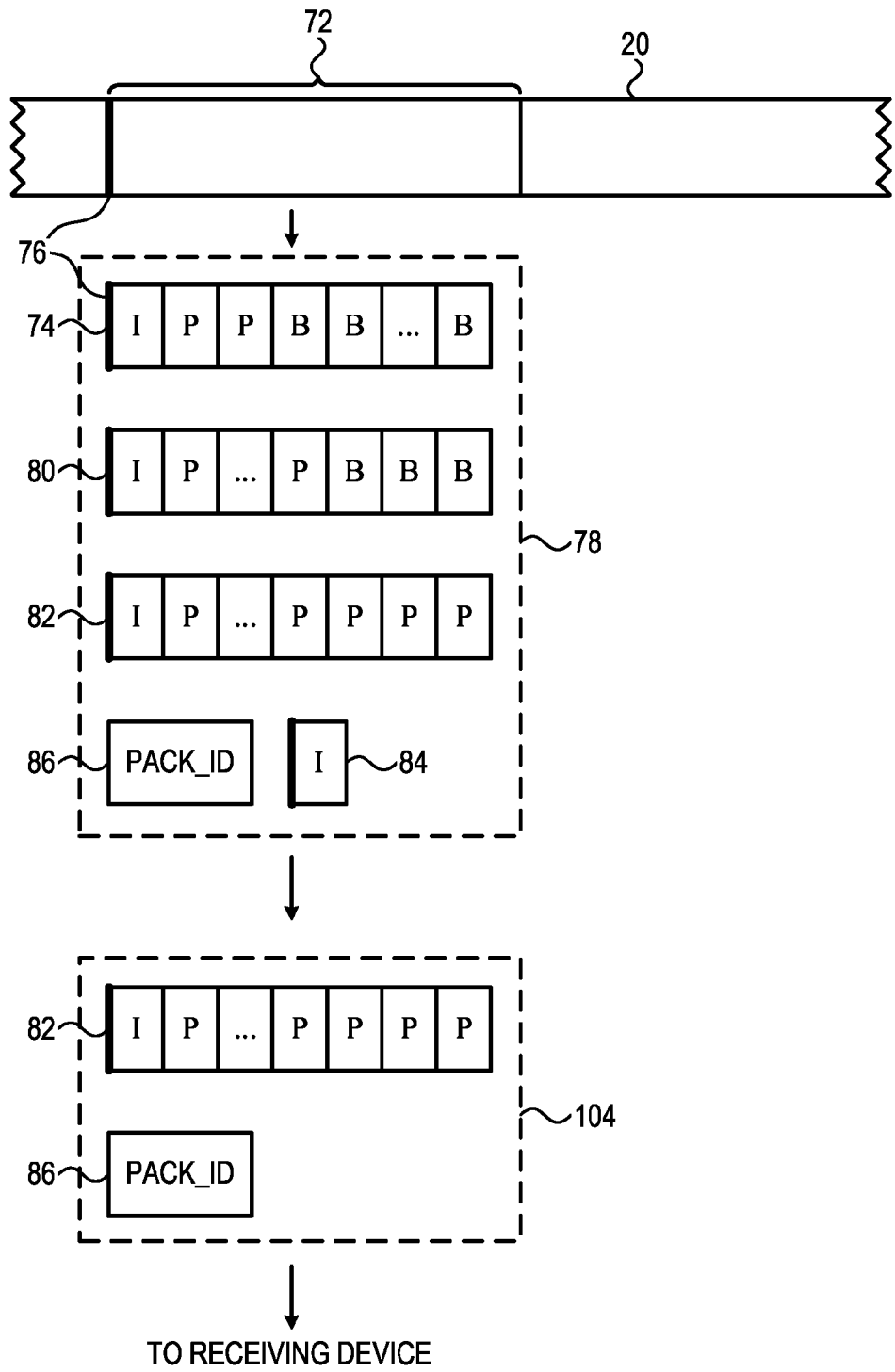
FIG. 2 is a diagram explaining the function of a channel pack module in the system shown in FIG. 1, in accordance with an embodiment of the invention.

Reference is now made to FIG. 2, which is a diagram explaining the function of the channel pack module 16 (FIG. 1) in accordance with an embodiment of the invention. The channel pack module 16, as noted above, is responsible for packing the channel streams into decodable audio and video elements or packs. A channel pack at least contains one stream slice, e.g., a segment 72 of stream 20 that includes at least an MPEG2-TS I-frame, and therefore is self-contained and decodable. Alternatively, the slice could include an IDR-frame in the case of an H264 AVC video stream. Other compressed formats may also be processed, mutatis mutandis.

An original slice 74, including the segment 72 of the video stream 20, is aligned with GOP boundary 76. The slice 74 is re-encoded on-the-fly to generate several new slices having reduced frame quality parameters, using well-known constrained average bit rate encoding techniques. The new slices may be encoded at lower resolution. Additionally or alternatively the new slices may be encoded at a lower framing rate. Typically, several re-encoded slices are generated having different quality parameters. An exemplary channel pack 78 comprises the original slice 74 and three re-encoded slices 80, 82, 84. The output parameters of channel pack 78 are shown in Table 2. Each slice in the channel pack 78 is also identified by a unique channel pack identifier 86, referred to herein as a "pack_Id", which comprises the classic DVB triplet "onid.tsid.sid" (original network identifier; transport stream identifier; station identifier) and the program clock reference (PCR) value of the first packet of the slice in the transport stream. Thus, the exemplary channel pack 78 is composed of (1) the channel pack identifier 86; (2) the original slice taken from the audio/visual stream (slice 74); and (3) one of the re-encoded sub-slices (slices 80, 82, 84). While slices 80, 82 are both transmitted at 25 fps, slice 80 has B frames, and slice 82 has none because it has been encoded at a higher compression rate than slice 80. Higher compression rates are of course, associated with progressively reduced frame quality.

It will be evident that appending original slices of successive channel packs (respective slices corresponding to slice 74) would reconstitute the stream 20.

TABLE 2

| Slice 74 | Transmission: 12 Frames @ 12 Mbps |
| --- | --- |
| | Size: 6 Mb |
| | Framing Rate 25 fps |
| | Pack_id |
| Slice 80 | Transmission: 12 Frames @ 6 Mbps |
| | Size 3 Mb |
| | Framing Rate 25 fps |
| | Pack_id |
| Slice 82 | Transmission: 12 Frames @ 3 Mbps |
| | Size 1.5 Mb |
| | Framing Rate 25 fps |
| | Pack_id |
| Slice 84 | Transmission: 1 Frame @ 1 Mbps (I-Frame Only) |
| | Size 0.5 Mb |
| | Framing Rate 1 fps |
| | Pack_id |

The slices 80, 82, 84 may be re-encoded in the channel pack module 16 with decimated encoding quality parameters on-the-fly and in parallel. Indeed, the channel pack module 16 typically processes all the streams 20, 22, 24, 26, 28 (FIG. 1) concurrently in this manner. However, in view of different characteristics of the streams 20, 22, 24, 26, 28, their respective channel packs may be generated with different numbers of encoded sub-slices and different degrees of decimation.

Table 3 shows output parameters of a channel pack assembled from another concurrently received digital stream (not shown in FIG. 2), in which the output parameters are optimized differently from those of Table 2, reflecting the different characteristics of the two digital video streams.

TABLE 3

| Slice A | Transmission: 6 Frames @ 6 Mbps |
| --- | --- |
| | Size: 3 Mb |
| | Framing Rate 25 fps |
| | Pack_id |
| Slice B | Transmission: 6 Frames @ 3 Mbps |
| | Size 1.5 Mb |
| | Framing Rate 25 fps |
| | Pack_id |
| Slice C | Transmission: 6 Frames @ 1.5 Mbps |
| | Size 0.75 Mb |

TABLE 3-continued

| | |
|---|---|
| Slice D | Framing Rate 25 fps<br>Pack_id<br>Transmission: 1 Frame @ 0.5 Mbps (I-Frame Only)<br>Size 0.25 Mb<br>Framing Rate 1 fps<br>Pack_id |

Figure 3:
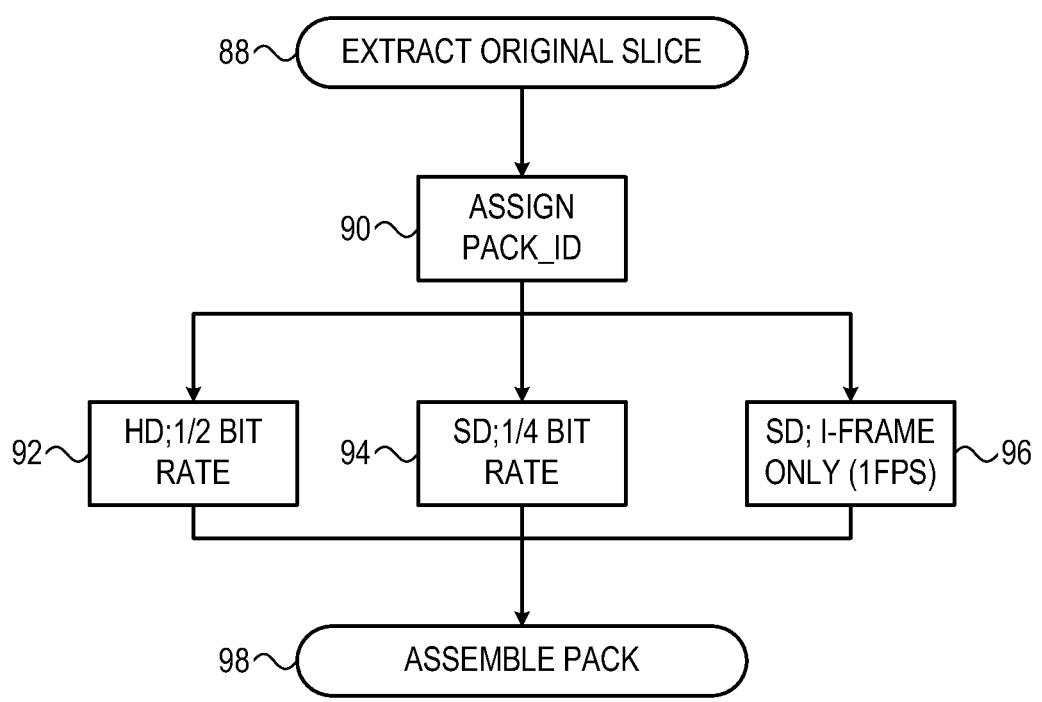
FIG. 3 is a flow chart illustrating an exemplary operation of the channel pack module shown in FIG. 1 in accordance with an embodiment of the invention.

Reference is now made to FIG. 3, which is a flow chart illustrating an exemplary operation of the channel pack module 16 (FIG. 1) in accordance with an embodiment of the invention. The method is explained for clarity with respect to the example of FIG. 2. At initial step 88 original slice 74 is extracted from stream 20.

Next, at step 90, at time $t_0$ a current pack is assigned its pack_ID.

Next, the slice 74 is passed to parallel re-encoding tasks (steps 92, 94, 96), in which the re-encoded slices 80, 82, 84 are derived from the slice 74. The parameters are generally given in Table 2. For purposes of this example, it is assumed that original slice 74 has a HD format. In step 92, slice 80 retains the HD format of slice 74, but has half its bit rate. In step 94, slice 82 has ¼ the bit rate of slice 74 and is reduced to SD resolution. In step 96 the framing rate is reduced to one frame per second. Additionally or alternatively, any number of re-encoded slices having many combinations of decimated parameters and non-decimated parameters other than those shown in FIG. 2 and FIG. 3 may be included in a channel pack. At final step 98 the channel pack 78 is assembled and transmitted to a storage resource, e.g., the channel database 42 (FIG. 1).

Returning to FIG. 1, a profile 100 of the receiving device 44 may be maintained in a data store holding a profile database 102. The profile 100 includes the bit rate and framing rate information for each slice in a channel pack. The profile database 102 may optionally include such data as an identifier of the receiving device 44, the available bandwidth of a communication channel between the fast channel change server 14 and the receiving device 44, and may include the location of the receiving device 44 in a network topology and a description of a delivery path to the receiving device 44 through the data network 48. The fast channel change server 14 uses the profile 100 to optimize the delivery time of the channel packs transmitted to the receiving device 44. This is done by minimizing the size of the channel packs as much as is practical. In the case of delivery via a network, delivery time is further optimized by judicious choice of the delivery path between the fast channel change server 14 and the receiving device 44. The channel packs stored in the channel database 42 include a relatively extensive series of progressively decimated slices. However, the fast channel change server 14 typically generally does not transmit an entire stored channel pack to the receiving device 44, but rather is adaptive to a desired bit rate by choosing an appropriate slice of a stored channel pack to generate a revised channel pack that is optimized according to the current or predetermined capabilities of the requestor. The fast channel change server 14 is responsible to determine the optimum slice to transmit to the receiving device 44. The fast channel change server 14 may determine or estimate the path latency between the fast channel change server 14 and the receiving device 44 and vary the slice that is included in the revised channel pack sent in response to the current get_pack request or a subsequent get_pack request. Thus, if the path latency increases, a slice having a greater reduction of frame quality parameters is selected, and vice versa.

Additionally or alternatively to maintaining the profile 100, the maximum acceptable bit rate and other capabilities of the receiving device 44 may be incorporated in a get_pack request received by the fast channel change server 14 from the receiving device 44.

Channel packs are stored in the channel database 42. However when servicing a get_pack request, the fast channel change server 14 assembles a new, generally smaller pack, taking into consideration the information in the profile 100 (or the get_pack request) in order to determine which component of the channel pack to transmit to the receiving device 44. If, for instance, the bandwidth between the fast channel change server 14 and the receiving device 44 is about 4 Mb/s, the optimum version of the smaller pack 104 would include slice 82 (4 Mb/s*0.5 s>size of (slice 82)=1.5 Mb). In this example, as shown in FIG. 2, pack 104 includes slice 82 of the channel pack 78, but does not include slices 74, 80, 84. The size-optimized slices in the packs 78, 104 are all referenced to the same channel pack identifier, channel pack identifier 86.

In some cases optimization of the transmission of channel packs to the receiving device 44 may require adjusting the network topology so as to position the fast channel change server 14 as "close" as possible to the destination, i.e., requiring a minimum number of hops between the fast channel change server 14 and the receiving device 44. This may be accomplished by nesting the fast channel change server 14 into a managed IP network, e.g., by establishing a preferred or mandatory path through the network, which may include bypassing some of the network elements.

Optimum Slice

As has been noted above, the fast channel change server 14 is responsible to determine the optimum slice to be transmitted to the receiving device 44. One method involves a first order linear estimator. For example, assume a channel packing arrangement having three profiles, as shown in Table 4

TABLE 4

| Profile ID | Frame Quality |
|---|---|
| 0 | Low |
| 1 | Medium |
| 2 | High |

One slice, denoted by slice(Profile), is sent to a receiver in response to a get_pack request.

Let Playback_time_slice be the duration of playback of a slice, e.g., 1 GOP=500 ms.

Let SizeOf(slice(profile)) denote the size in bytes of the slice of a given profile.

Let packId be a monotonic sequence 0, 1, . . . ,

Let Delivery_time_slice(PackId) be the elapsed time for delivery from the server to the receiver of a channel pack having a packId with an optimum ProfileId(PackId=n).

A function, simple_func( ), returns an optimum profile when the previous optimum profile is established as shown in the pseudocode of Listing 1:

Listing 1 simple_func(packid)
{
On established condition simple_func(packid>1) is:
{
- Compute epsilon = sizeof(slice(Profile(packid))) /

Listing 1

```
    sizeof(slice(1+Profile(packid)))
        (note: epsilon < 1 by construction)
If Delivery_time_slice(packId−1) > Playback_time_slice    then
    profileId(packid) = profile(packId−1) − 1 //go to lower profile
Else If Delivery_time_slice(packId−1) > epsilon * Playback_time_slice
    then profileId(packid) = profile(packId−1) //stay at the same profile
Else
    profileId(packid) = profile(packId) + 1 //go to the higher profile)
}
On start condition simple_func(packId>1) is:
{
PacKid=0
profileId(packId=0) = "low";
// optimize delivery time
// because fast channel change is the most important.
}
}
```

Alternatively, the optimum profile can be estimated using higher order kalman filters with hysteresis.

A get_pack request has the format: get_pack (channel_id), where "channel_id" identifies the desired video stream. The fast channel change server 14 responds with a channel pack: pack(slice(profile(packId+n))).

Fast Channel Change Synchronization

Continuing to refer to FIG. 1, the tuner 52 and the synchronization component 66 are responsible for: (1) starting a delayed broadcast channel change sequence by tuning to and monitoring the transport stream pipeline of the new channel; and (2) starting an immediate broadband channel change sequence by submitting a burst of consecutive get_pack requests for the new channel to the fast channel change server 14. The fast channel change server 14 responds to the requests in a manner that insures that the receiving device 44 and the synchronization component 66 receive channel packs at intervals that are less than the playback duration of corresponding slices of the conventional video stream of the new channel. The composition of the channel pack (e.g., pack 104 (FIG. 2)) is optimized by the fast channel change server 14, taking into consideration information embedded in the get_pack request or stored in the profile 100 as the case may be.

In the following discussion, it is assumed that the first decodable element of a new channel is included in a channel pack produced by the channel pack module 16, and not from the conventional video stream of the new channel. While the receiving device 44 also receives the stream of the new channel conventionally, it is usually not immediately decodable and at this point is useful mainly for its PCR values. PCR values of the conventional stream and channel packs are monitored throughout the channel change operation by the synchronization component 66. It will be appreciated that the channel packs and the conventional video stream of the new channel are transmitted via different communication channels. The PCRs of both of these are monitored, and a current PCR value is maintained by the synchronization component 66 for purposes of synchronizing the channel packs with the conventional video stream of the new channel. This can be achieved by the by relating the PCRs as shown in Listing 2:

Listing 2

```
PCR(last_pack_played)   <   PCR(last_conventional_received)
such   as timeshifting = PCR(last_conventionnal_received) −
PCR(last_pack_played).
When   PCR(any_pack_buffered)   ≈   PCR(conventional)   then
switch   to conventional stream.
```

Once decoding of slices of received channel packs is begun by the source decoder 58, the synchronization component 66 updates the current PCR value to the PCR value of the most recently received channel pack, optionally verifying that its pack_ID of the corresponds to the new channel.

It will be evident that the process of requesting, generating, dispatching and receiving channel packs introduces a time shift or delay relative to the realtime conventional video stream. The value of the delay is dependent on the time required for assembling, transmitting, and unpacking the channel packs. A typical value is about 3.5 s for an average GOP at 25 frames per second. Consequently, PCR values received by the transport demultiplexing and decryption module 54 immediately following the inception of decoding during the channel change operation correspond to times that are subsequent to PCR values of received channel packs. As the channel change operation progresses, the time shift decreases because the channel packs, previously cached in the fast channel change server 14, are dispatched and processed more rapidly than the playback time of corresponding frames of the conventional video stream of the new channel. The synchronization component 66 determines when the time shift is below a threshold value, termed a "crossing value", and it then switches to the conventional broadcast stream to complete the channel change operation, as explained above with reference to Listing 2. At that point no further get_pack requests are issued by the synchronization component 66 until the next user request for a channel change.

EXAMPLE

Figure 4:
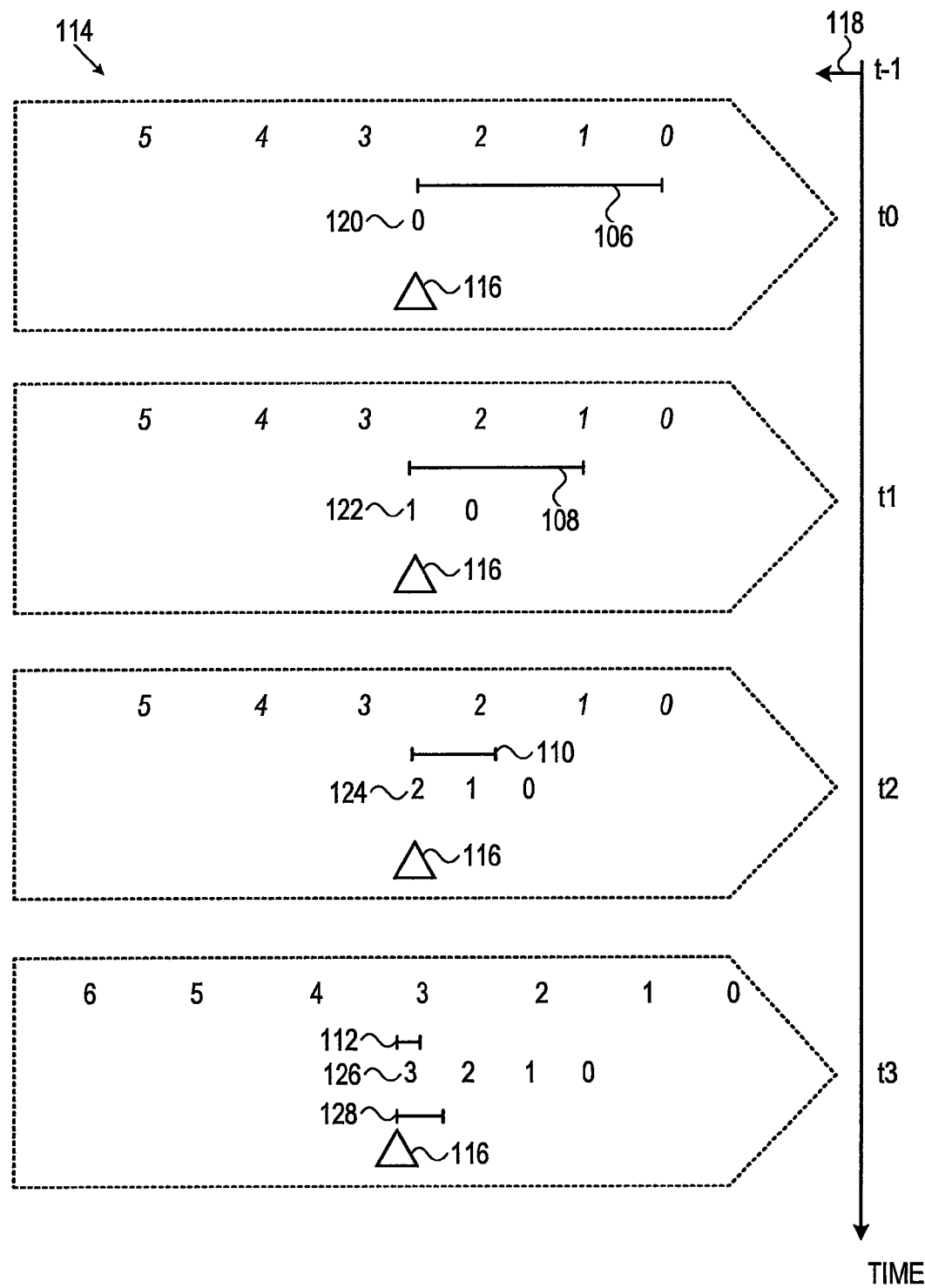
FIG. 4 is a series of diagrams illustrating the time relationships of frames of a conventional video stream of the new channel and channel packs during a fast channel change operation in accordance with an embodiment of the invention.

Reference is now made to FIG. 4, which is a series of four diagrams, which are snapshots illustrating the time relationships of corresponding frames of the conventional video stream of the new channel and channel packs from the perspective of the synchronization component 66 during a fast channel change operation in accordance with an embodiment of the invention. Some of the dimensions in FIG. 4 are exaggerated for purposes of explication. In each of the diagrams, GOPs of the conventional transport stream are presented in a row, numbered in italic font. Channel packs containing corresponding GOPs are presented in another row underneath the conventional frames, numbered in regular font. The magnitudes of respective time shifts 106, 108, 110, 112 between corresponding GOPs of the channel packs and conventional video stream 114 of the new channel appearing at the synchronization component 66 (FIG. 1) are measured by the lengths of horizontal lines located between the two rows of frame numbers in each diagram. The synchronization component 66 is represented in FIG. 4 by triangles 116.

At a time $t_{-1}$ a user request for a fast channel change, indicated by arrow 118, is issued. Responsively, the synchronization component 66 issues a get_pack request for the new channel. Typically the communication channel for the get_pack request is via a data network, for example the Internet, employing HTTP commands. However, any suitable network communications protocol may be used with an IP connection. The IP connection may rely on any physical layer. Alternatively, it is possible to employ many other communication techniques for transmission of the get_pack request, e.g., data transmission using telephone lines, terrestrial or satellite radio transmitters and combinations thereof.

At time $t_0$ the fast channel change server 14 has responded. It will be recalled that several channel packs are typically buffered in the fast channel change server 14. Channel pack-0 120, the oldest available channel pack in the channel database 42 (FIG. 1) is transmitted, and becomes available to the synchronization component 66. However, at this point in time the synchronization component 66 sees intermediate frames of GOP 2 of the conventional stream, which cannot be decoded as the I-frame of GOP 2 is no longer available. Channel Pack-0 120 is decoded and rendered on the display 70 (FIG. 1). The viewer thus sees a nearly immediate response to the channel change request. It will be noted that time shift 106 is large relative to time shifts 108, 110, 112. As the synchronization component 66 is now processing channel packs, it issues another get_pack request.

At time $t_1$ channel pack-1 122 arrives at the synchronization component 66 and is processed in the same manner as channel pack-0 120. It will be noted that the time interval between arrivals of channel pack-0 120 and channel pack-1 122 is shorter than that between passages of consecutive GOPs of the conventional video stream through the synchronization component 66. This is possible as the channel packs are decimated, as described above. Thus, the channel packs can be handled by a communication channel having restricted bandwidth more easily than the conventional video stream, and in the case of decreased framing rate, can be rendered more rapidly in the receiving device 44 (FIG. 1).

At time $t_2$ channel pack-2 124 is received and decoded as above. The time shift 110 is now approximately half as large as the time shift 106.

At time $t_3$ channel pack-3 126 is received. The time shift 112 is minimal, and a crossing-point has been reached. The occurrence of a crossing point may be defined as a time shift that is less than a threshold value 128. Alternatively, a crossing point may be defined as a zero or negative value of the time shift between the channel pack and the corresponding segment of the conventional video stream of the new channel. In any case, once the crossing point has been identified, the synchronization component 66 ceases to issue get_pack requests and the receiving device 44 begins to process the conventional video stream of the new channel, thereby completing the channel change operation.

Reverting to FIG. 1, in order to adequately service the get_pack requests, the channel pack module 16 may cache different numbers of channel packs for the various channels available to the receiving device 44. Caching the three most recent GOPs is typical. In general, there is a trade-off between the resources required to cache the data in the channel pack module 16 and the channel database 42 and the quality of service ultimately provided to the receiving device 44. If too few channel packs are cached, there may be a delay in the video presentation of the new channel, or dropped frames may occur. If too many are cached, the expense of the hardware may become a limiting factor. Nevertheless, in one embodiment, intentional frame dropping may he used in order to reduce the expense of channel pack assembly and storage in the channel pack module 16 and channel database 42. While the user's perception of seamless channel change is somewhat impaired because of the reduced frame quality of the channel packs, this variant satisfies an immediate need to view at least some image data of the new channel.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of changing channels in a hybrid multicast video distribution environment, comprising the steps of:
    receiving, decoding and rendering a first multicast video stream on a display using a receiving device having a synchronization module;
    receiving an order for a channel change operation from the first multicast video stream to a second multicast video stream;
    responsively to the order and while receiving the second multicast video stream requesting a channel pack from a fast channel change server, the channel pack comprising an encoded segment of the second multicast video stream having an independently decodable frame and zero or more predicted frames of the second multicast video stream, wherein frame quality parameters of the encoded segment are less than frame quality parameters of a corresponding segment of the second multicast video stream;
    accepting the requested channel pack from the fast channel change server;
    decoding and rendering the encoded segment of the accepted channel pack on the display;
    in the synchronization module determining a PCR based time shift between a frame of the accepted channel pack and a corresponding frame of the second multicast video stream;
    requesting a new channel pack from the fast channel change server, and with the new channel pack again performing the steps of accepting the requested channel pack, decoding and rendering the encoded segment and iteratively determining a decreasing PCR based time shift at intervals that are less than a playback duration of corresponding segments of the second multicast video stream until the PCR based time shift is less than a predetermined value; and
    thereafter rendering the second multicast video stream on the display.

2. The method according to claim 1, wherein the encoded segment is a down-sampled version of the corresponding segment of the second multicast video stream, such that the encoded segment has a smaller bit-rate than the corresponding segment of the second multicast video stream.

3. The method according to claim 1, wherein the encoded segment base smaller framing rate than the corresponding segment of the second multicast video stream.

4. The Method according to claim 1, wherein the first multicast video stream has it different video compression format than the second multicast video stream.

5. The method according to claim 1, wherein the first multicast video stream is received at a different bit rate than the second multicast video stream.

6. An apparatus for changing channels in a hybrid multicast video distribution environment, comprising:
    a receiver operative for decoding and rendering a first multicast video stream on a display and haying a user interface and a communications interface linked to a fast channel change server;
    a synchronization module cooperative with the receiver, the receiver and the synchronization module are cooperative for performing the steps of receiving an order via the user interface for a channel change operation from the first multicast video stream to a second multicast video stream;

responsively to the order and while receiving the second multicast video stream requesting a channel pack via the communications interface from the fast channel change server, the channel pack comprising an encoded segment of the second multicast video stream having an independently decodable frame and zero or more predicted frames of the second multicast video stream, wherein frame quality parameters of the encoded segment are less than frame quality parameters of a correspond segment of the second multicast video stream;

accepting the requested channel pack from the fast channel change server;

decoding and rendering the encoded segment of the accepted channel pack on the display;

in the synchronization module determining a PCR based time shift between a frame of the accepted channel pack and a corresponding flame of the second multicast video stream;

requesting a new channel pack from the fast channel change server, and with the new channel pack again performing the steps of accepting the requested channel pack, decoding and rendering the encoded segment and iteratively determining a decreasing PCR based time shift at intervals that are less than a playback duration of corresponding segments of the second multicast video stream until the PCR based time shift is less than a predetermined value; and thereafter decoding and rendering the second multicast video stream on the display.

7. The apparatus according to claim 6, wherein the encoded segment is a down-sampled version of the corresponding segment of the second multicast video stream, such that the encoded segment has a smaller bit-rate than the corresponding segment of the second multicast video stream.

8. The method according to claim 6, wherein the encoded segment has a smaller framing rate than the corresponding segment of the second multicast video stream.

9. The method according to claim 6, wherein the first multicast video stream has a different video compression format than the second multicast video stream.

10. The method according to claim 6, wherein the first multicast video stream is received at a different bit rate than the second multicast video stream.

\* \* \* \* \*

UNITED STATES PATENT AND TRADEMARK OFFICE
CERTIFICATE OF CORRECTION

PATENT NO.        : 9,219,940 B2
APPLICATION NO.   : 14/113359
DATED             : December 22, 2015
INVENTOR(S)       : Gaillard et al.

Page 1 of 1

It is certified that error appears in the above-identified patent and that said Letters Patent is hereby corrected as shown below:

In the Specification:

in column 1, line 6, after "application", add --is a 35 USC §371 application of PCT/IB2012/051940, filed on 18 April 2012 and entitled "Fast Channel Change for Hybrid Device", which was published in the English language with International Publication Number WO 2012/150519, and which--.

In the Claims:

in column 14, line 51, (second line of claim 3), delete "base" and substitute therefor --has a--.

in column 14, line 53, (first line of claim 4), delete "Method" and substitute therefor --method--.

in column 14, line 54, (second line of claim 4), delete "it" and substitute therefor --a--.

in column 14, line 62, (fourth line of claim 6), delete "haying" and substitute therefor --having--.

in column 15, line 12, (twenty-first line of claim 6), delete "correspond" and substitute therefor --corresponding--.

in column 15, line 20, (twenty-ninth line of claim 6), delete "flame" and substitute therefor --frame--.

Signed and Sealed this
Twenty-third Day of August, 2016

Michelle K. Lee
*Director of the United States Patent and Trademark Office*